2,777,458

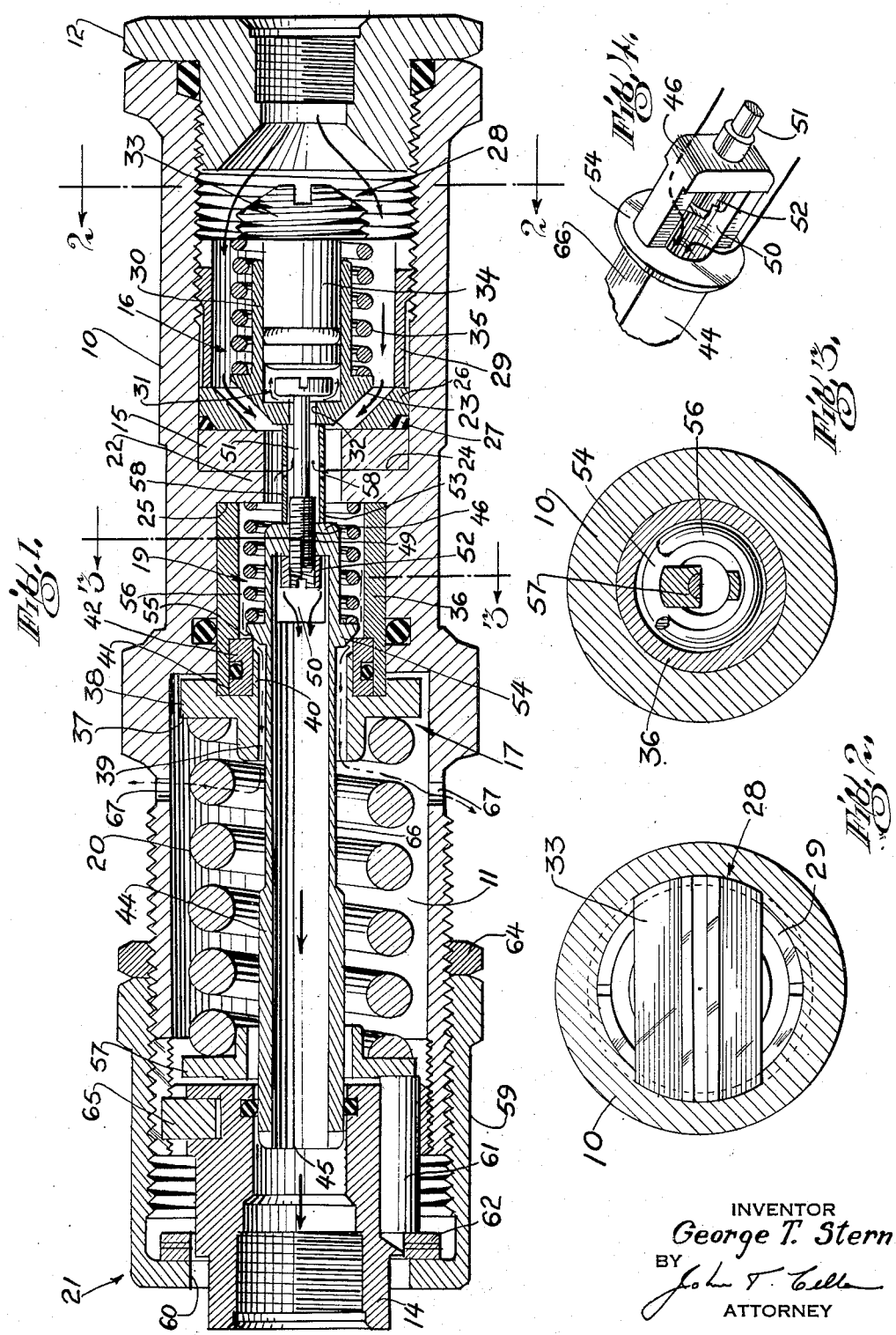
Jan. 15, 1957    G. T. STERN    2,777,458
PRESSURE REDUCER
Filed Aug. 30, 1954
INVENTOR
George T. Stern
BY
ATTORNEY United States Patent Office 2,777,458
Patented Jan. 15, 1957

PRESSURE REDUCER

George T. Stern, Orange, N. J., assignor to Specialties Development Corporation, Belleville, N. J., a corporation of New Jersey Application August 30, 1954, Serial No. 453,091

10 Claims. (Cl. 137—116.5)

This invention relates to valves, and, more particularly, to valves of the in-line, automatic pressure reducing type.

An object of the present invention is to provide a high pressure, high flow, automatic pressure reducing valve having a low pressure drop along the flow path.

Another object is to provide such a valve which maintains a constant outlet pressure for any pressure setting within its range regardless of variations in the supply pressure.

Another object is to provide such a valve which has a streamlined flow path from inlet to outlet.

Another object is to provide such a valve which has a built-in automatic relief valve.

A further object is to provide such a valve which is light in weight, is compact, requires an envelope which occupies only a little more space than its connecting tubing, and is efficient and reliable in operation.

A still further object is to provide such a valve which is adjustable to vary the outlet pressure without disturbing the line connections.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a reducer comprising a body having a bore, an inlet, an outlet, and a valve seat between the inlet and the outlet provided with a port, a valve member in the bore between the inlet and the seat for engaging the seat, tubular piston means in the bore between the outlet and the seat, a regulating spring opposing movement of the piston means adapted to yield and permit movement of the piston means in a direction towards the outlet when fluid under pressure in the outlet reaches a predetermined value, tubular stem means carried by the piston means for movement therewith, the stem means having an open outlet end adjacent the outlet and having an inlet end adjacent the port formed with inlet means in fluid flow communication with the port, the open outlet end and the inlet means constituting the sole openings in the stem means, spacer means carried by the stem means, the spacer means extending through the port and positioned between the stem means and the valve member, and means for urging the valve member against the spacer means and towards the seat.

A preferred embodiment of the invention has been chosen for purposes of illustration and description, and is shown in the accompanying drawing, forming a part of the specification wherein:

Fig. 1 is a longitudinal sectional view illustrating the elements of a valve in accordance with the invention, Fig. 2 is a sectional view taken along the lines 2—2 of Fig. 1, Fig. 3 is a sectional view taken along the lines 3—3 of Fig. 1, and Fig. 4 is a fragmentary perspective view of a portion of the stem means illustrating part of the flow path.

Referring to the drawing in detail and more particularly to Fig. 1 thereof, there is shown a body 10 having a longitudinal bore 11, an inlet fitting 12 at one end thereof, an outlet fitting 14 at the other end thereof, a ported valve seat 15 between the inlet and the outlet, valve means 16 adjacent the inlet for engaging the seat, piston means 17 disposed for longitudinal movement in the bore between the seat and the outlet, tubular stem means 19 carried by the piston for movement therewith extending from adjacent the ported seat to adjacent the outlet, a regulating spring 20 for opposing movement of the piston and adjustment means 21 mounted on the body at the outlet end thereof for varying the force of the regulating spring.

The body 10 is generally cylindrical and the bore 11 extends longitudinally therethrough and is internally threaded at each end to receive the inlet fitting 12 and the outlet fitting 14, both of which are provided with central bores. The bore 11 is formed with an annular radial projection 22 providing oppositely facing shoulders 24 and 25 against the former of which is mounted the centrally ported seat 15. As annular O-ring retainer 26 is disposed in the bore 11 abutting the upstream side of the seat. This retainer has a port of greater diameter than that of the seat port and has a beveled face on its upstream side and a recess for seating an O-ring 27 adjacent the seat 15 and the body 10. A tubular seat retainer 29 is screw threaded into the inlet end of the bore and has an end abutting the O-ring retainer to maintain the seat and O-ring retainer in position.

The valve means 16 includes a cup-shaped valve member 30 providing a cylindrical bore 31 and having a central aperture 32 in its base and an annular beveled surface 23 adapted to engage the seat 15. The diameter of the bore 31 is equal to the diameter of the opening in the ported seat 15. As shown in Figs. 1 and 2, a generally T-shaped support 28 has a crosspiece 33 which is screw threaded into the bore 11 and has a cylindrical stem 34 which extends longitudinally of the body 10 and fits into the bore 31 to slideably support the member 30 thereon. A helical spring 35 extends between the crosspiece of the support 28 and a suitable shoulder on the valve member 30 to urge the latter in a direction towards the seat 15.

The piston means 17 comprises a tubular sleeve 36 slideably mounted in the bore 11 and having one end thereof normally abutting the shoulder 25. An annular spring retainer 37 is formed with a central opening 39, a central tubular section 40, and an outer tubular section 38 into which is secured the downstream end of the sleeve 36. The sleeve 36 is internally stepped and cooperates with the section 40 to provide an annular space or recess 41 for receiving an annular ring 42 which protrudes from the upstream open end thereof for a purpose to be described.

As shown in Figs. 1, 3 and 4, the stem means 19 includes an elongate tubular member 44 extending through the opening 39 in the spring retainer 37 and having an outlet end 45 slidably mounted in the outlet fitting 14. The tubular member has a closed inlet end 46 adjacent the projection 22 formed with a threaded longitudinal aperture 49 and a pair of opposed radial openings 50 are provided therein adjacent the inlet end. A bolt 51 is adjustably secured in the aperture 49 by a nut 52 within the member 44 and extends through the ported seat 15 and the aperture 32 in the valve member 30 allowing a small clearance therebetween. The bolt head is disposed within the bore 31 and is of greater diameter than the aperture 32 to connect the bolt and the member 30. A tubular spacer 53 formed with a pair of radial apertures 58 midway between the ends thereof extends between the inlet end 46 of the tubular member 44 and the base of the valve member 30 surrounding but spaced from the shank of the bolt 51. The member 44 is formed with an external flange 54 having an inclined face 55 normally abutting the ring 42, and a helical spring 56 extends between the shoulder 25 and the flange 54 to urge the member 44 in a direction towards the outlet.

The regulating spring 20 is a helical compression spring extending between the spring retainer 37 and an annular guide member 57 adjacent the outlet fitting 14. The regulating spring opposes movement of the piston means 17 in a direction towards the outlet fitting.

The adjustment means 21 comprises a cup-shaped cap 59 which is screw threaded to the external surface of the body 10 at its outlet end and is formed with a central opening 60 through which the outlet fitting extends. Three circumferentially spaced pins 61 (only one being shown) pass through suitable longitudinal bores in the outlet fitting and have one end bearing against the guide member 57 and the other end abutting an annular bearing washer 62 which in turn abuts the inner end of the cap 59. A lock nut 64 is screw threaded on the body to retain the cap 59 in its adjusted position.

The central bores of the inlet and the outlet fittings are screw threaded to receive tubes for conducting fluid under pressure, and a locking pin 65, mounted in recesses in the outlet fitting and the body 10, prevents movement of that fitting with respect to the body in the event that the position of the cap 59 is altered.

The invention as described thus far, constitutes a pressure reducer, which operates in the manner about to be discussed.

Prior to installing the apparatus in the line, the cap 59 may be adjusted to cause the spring 20 to exert a desired force upon the piston means 17 and the bolt 51 is adjusted to provide a desired clearance between the bolt head and the inner surface of the base of the valve member 30. The unit is then installed in the fluid conducting line with the inlet fitting 12 at the high pressure side thereof. The reducer is normally open, the valve member being held off the seat 15 by the regulating spring 20 acting through the piston means 17 and the spacer 53.

As fluid under pressure enters the apparatus through the fitting 12, it flows around the support 28 and the valve member 30, through the ported seat 15, undergoing a pressure drop, around the inlet end of the member 44 and, as best illustrated in Figs. 1 and 4 by the solid line arrows, into the radial openings 50, and through the member 44 to the outlet. At the same time, the fluid, at its lower or outlet pressure, enters the apertures 58 in the spacer 53 and flows through the aperture 32 in the valve member to enter the bore 31, wherefore the valve member is balanced by equal and opposite forces so that it is urged towards the seat 15 solely by the force of the spring 35.

As the outlet pressure builds up, an increasing force is applied to the regulating spring 20 through the piston means until it is sufficient to overcome the force of the spring, whereupon, the tubular member 44 and the piston means, moving as a unit, begin to compress the spring. The valve member 30 also begins to move towards the outlet under the influence of the spring 35, thus reducing the area between the valve member and the seat 15 and restricting the flow therebetween. When the outlet pressure reaches a predetermined value, the valve member abuts the seat 15 cutting off all flow. A reduction in outlet pressure permits the regulating spring to overcome the decreased force of the pressure acting on the piston means and to force the valve member off the seat by the return travel of the tubular member and the spacer 53. Due to the fact that the regulating spring is affected only by the outlet pressure and not by the inlet pressure, it will be understood that variations in the inlet pressure, within predetermined limits, will not affect the outlet pressure but that the same will be maintained constant by reason of the balance of forces due to fluid pressure acting upon the valve member 30. This balance is maintained in spite of inlet pressure variations so that such variations are not transmitted to the regulating spring 20.

To provide for the relief of excess pressure in the reducer discussed heretofore, the tubular member 44 is formed with a circular cross section having a pair of diametrically opposite flat side surfaces 66 extending from the flange 54 through the annular opening 39 in the spring retainer 37 to a point upstream of the outlet end 45 of the tubular member, as shown in Figs. 1 and 4, and the body 10 has a pair of diametrically opposite radial ports 67 downstream of the projection 22.

If, after the main valve has closed, the outlet pressure continues to rise as, for example, by leakage past the seat 15, the force behind the piston means will increase, causing the regulating spring to compress even further whereupon the piston means and the tubular member, urged by the spring 56, move towards the outlet until the head of the bolt 51 abuts the inner surface of the base of the valve member 30, the adjustable clearance between the bolt head and the valve member permitting the desired amount of overtravel of the tubular member required to obtain the correct relief pressure setting.

Any additional increase in the outlet pressure then causes the piston means to move towards the outlet separating the ring 42 from the inclined face 55 of the flange 54 without movement of the tubular member 44. The excess pressure is thereby relieved past the flange 54, and along the flat surfaces 66 to the relief ports 67 in the body 10, as indicated by the broken line arrows on Fig. 1. When the excess pressure is relieved, the regulating spring forces the ring 43 to seat against the flange 54 sealing off the relief flow.

The outlet pressure may be varied by turning the adjustment cap 59 to alter the force exerted on the piston means by the regulating spring 20. The torque is taken up by the bearing washer 62 and the adjustment force is transmitted through the pins 61 to the guide member 57 and the spring 20. Rotation of the cap 59 does not cause rotation of the outlet fitting 14 which is restrained by the locking pin 65. After the desired adjustment is made, the cap is locked in position by the lock nut 64.

For sealing purposes conventional O-rings are disposed at suitable locations such as between the valve member bore 31 and the support 34, the sleeve 36 and the body 10, the outlet fitting 14 and the member 44 and the ring 42 and the sleeve 36.

From the foregoing description, it will be seen that the present invention provides a high pressure, high flow, automatic pressure reducing valve having a streamlined flow path providing a low pressure drop and having a built-in automatic relief valve. It will also be seen that the valve is light in weight, is compact, efficient and reliable in operation, maintains a constant outlet pressure for any pressure setting within its range regardless of variations in supply pressure and may be adjusted to vary the outlet pressure without disturbing the line connections.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A pressure reducer of the class described comprising, a body having a bore, an inlet, an outlet, and a valve seat between said inlet and said outlet provided with a port, a valve member in said bore between said inlet and said seat for engaging said seat, tubular piston means in said bore between said outlet and said seat, a regulating spring opposing movement of said piston means adapted to yield and permit movement of said piston means in a direction towards said outlet when fluid under pressure in said outlet reaches a predetermined value, tubular stem means carried by said piston means for movement therewith, said stem means having an open end adjacent said outlet and having an inlet end adjacent said port formed with inlet means in fluid flow communication with said port, said open outlet end and said inlet means constituting the sole openings in said stem means, spacer means carried by said stem means, said spacer means extending through said port and positioned between said stem means and said valve member, and means for urging said member against said spacer means and towards said seat.

2. A pressure reducer of the class described comprising, a body having a bore, an inlet, an outlet, and a valve seat between said inlet and said outlet provided with a port, a valve member in said bore between said inlet and said seat for engaging said seat and formed with a recess extending towards said inlet, tubular piston means in said bore between said outlet and said seat, a regulating spring opposing movement of said piston means adapted to yield and permit movement of said piston means in a direction towards said outlet when fluid under pressure in said outlet reaches a predetermined value, tubular stem means carried by said piston means for movement therewith, said stem means having an open outlet end adjacent said outlet and having an inlet end adjacent said port formed with inlet means in fluid flow communication with said port, said open outlet end and said inlet means constituting the sole openings in said stem means, spacer means carried by said stem means, said spacer means extending through said port and positioned between said stem means and said valve member, a guide member in said bore adjacent said inlet formed with a projection slideably engaging said recess, and means for urging said valve member against said spacer means and towards said seat.

3. A pressure reducer of the class described comprising, a body having a bore, an inlet, an outlet, and a valve seat between said inlet and said outlet provided with a port, a valve member in said bore between said inlet and said seat for engaging said seat and formed with a recess extending towards said inlet, the area defined by said port being equal to the area defined by said recess, tubular piston means in said bore between said outlet and said seat, a regulating spring opposing movement of said piston means adapted to yield and permit movement of said piston means in a direction towards said outlet when fluid under pressure in said outlet reaches a predetermined value, tubular stem means carried by said piston means for movement therewith, said stem means having an open outlet end adjacent said outlet and having an inlet end adjacent said port formed with inlet means in fluid flow communication with said port, said open outlet end and said inlet means constituting the sole openings in said stem means, spacer means carried by said stem means, said spacer means extending through said port and positioned between said stem means and said valve member, a guide member in said bore adjacent said inlet formed with a projection slideably engaging said recess, and means for urging said valve member against said spacer means and towards said seat.

4. A pressure reducer of the class described comprising, a body having a bore, an inlet, an outlet, and a valve seat between said inlet and said outlet provided with a port, a valve member in said bore between said inlet and said seat for engaging said seat and formed with a recess extending towards said inlet, the area defined by said port being equal to the area defined by said recess, tubular piston means in said bore between said outlet and said seat, a regulating spring opposing movement of said piston means adapted to yield and permit movement of said piston means in a direction towards said outlet when fluid under pressure in said outlet reaches a predetermined value, tubular stem means carried by said piston means for movement therewith, said stem means having an open outlet end adjacent said outlet and having an inlet end adjacent said port formed with inlet means in fluid flow communication with said port, said open outlet end and said inlet means constituting the sole openings in said stem means, tubular spacer means formed with a radial aperture carried by said stem means, said spacer means extending through said port and positioned between said stem means and said valve member, said valve member having an aperture for establishing communication between said recess and said spacer means, a guide member in said bore adjacent said inlet formed with a projection slideably engaging said recess, and means for urging said valve member against said spacer means and towards said seat.

5. A pressure reducer of the class described comprising, a body having a bore, an inlet, an outlet, and a valve seat between said inlet and said outlet provided with a port, a valve member in said bore between said inlet and said seat for engaging said seat formed with a recess facing said inlet, tubular piston means in said bore between said outlet and said seat, a regulating spring opposing movement of said piston means adapted to yield and permit movement of said piston means in a direction towards said outlet when fluid under pressure in said outlet reaches a predetermined value, a tubular member carried by said piston means for movement therewith, said tubular member having an open outlet end adjacent said outlet and having an inlet end adjacent said port formed with inlet means in fluid flow communication with said port, said open outlet end and said inlet means constituting the sole openings in said stem means, a spring in said bore for urging said tubular member in a direction towards said outlet, tubular spacer means having a radial aperture carried by said tubular member extending through said port and positioned between said tubular member and said valve member, said valve member having an aperture for establishing communication between said recess and said spacer means, a rod adjustably secured to said inlet end of said tubular member and extending through said spacer means and said aperture in said valve member into said recess and formed with an enlarged portion in said recess of greater width than said valve member aperture, a guide member in said bore adjacent said inlet formed with a projection slideably engaging said recess, and means for urging said valve member against said spacer means and towards said seat.

6. Apparatus according to claim 5 wherein a cap formed with a central aperture is adjustably secured to the outlet end of said body and means extend between said cap and said regulating spring for varying the effectiveness of said spring when the position of said cap on said body is varied.

7. A pressure reducer of the class described comprising, a body having a bore, an inlet, an outlet, and a valve seat between said inlet and said outlet provided with a port, a valve member in said bore between said inlet and said seat for engaging said seat, tubular piston means in said bore between said outlet and said seat including valve seat means provided with an opening, a regulating spring opposing movement of said piston means adapted to yield and permit movement of said piston means in a direction towards said outlet when fluid under pressure in said outlet reaches a predetermined value, tubular stem means carried by said piston means for movement therewith extending through said opening and formed with flange means adapted to engage said seat means, said stem means having an open outlet end adjacent said outlet and having an inlet end adjacent said port formed with inlet means in fluid flow communication with said port, said open outlet end and said inlet means constituting the sole openings in said stem means, spacer means extending through said port and positioned between said stem means and said valve member, means for urging said member against said spacer means and towards said seat, means for urging said stem means in a direction to cause said flange means to engage said valve seat means, stop means associated with said stem means to limit the movement thereof in a direction towards said outlet, and said body having a port between said piston and said outlet providing communication between said bore and the atmosphere.

8. A pressure reducer of the class described comprising, a body having a bore, an inlet, an outlet, and a valve seat between said inlet and said outlet provided with a port, a valve member in said bore between said inlet and said seat for engaging said seat and formed with a recess extending towards said inlet, the area defined by said port being equal to the area defined by said recess, piston means in said bore between said outlet and said seat including valve seat means provided with an opening, a regulating spring opposing movement of said piston means adapted to yield and permit movement of said piston means in a direction towards said outlet when fluid under pressure in said outlet reaches a predetermined value, tubular stem means carried by said piston means for movement therewith extending through said opening and formed with flange means adapted to engage said seat means, said stem means having an open outlet end adjacent said outlet and having an inlet end adjacent said port formed with inlet means in fluid flow communication with said port, said open outlet end and said inlet means constituting the sole openings in said stem means, spacer means having a radial aperture extending through said port and positioned between said stem means and said valve member, said valve member having an aperture for establishing communication between said recess and said spacer means, means for urging said member against said spacer means and towards said seat, means for urging said stem means in a direction to cause said flange means to engage said valve seat means, a guide member in said bore adjacent said inlet formed with a projection slideably engaging said recess, stop means associated with said stem means to limit the movement thereof in a direction towards said outlet and said body having a port between said piston and said outlet providing communication between said bore and the atmosphere.

9. A pressure reducer of the class described comprising, a body having a bore, an inlet, an outlet, and a valve seat between said inlet and said outlet provided with a port, a valve member in said bore between said inlet and said seat for engaging said seat and formed with a recess extending towards said inlet, the area defined by said port being equal to the area defined by said recess, tubular piston means in said bore between said outlet and said seat including valve seat means provided with an opening, a regulating spring opposing movement of said piston means adapted to yield and permit movement of said piston means in a direction towards said outlet when fluid under pressure in said outlet reaches a predetermined value, a tubular member carried by said piston means for movement therewith extending through said opening and formed with flange means adapted to engage said seat means, said tubular member having an open outlet end adjacent said outlet and having an inlet end adjacent said port formed with inlet means in fluid flow communication with said port, said open outlet end and said inlet means constituting the sole openings in said stem means, spacer means having a radial aperture extending through said port and positioned between said tubular member and said valve member, said valve member having an aperture for establishing communication between said recess and said spacer means, means for urging said valve member against said spacer means and towards said seat, means for urging said tubular member in a direction to cause said flange means to engage said valve seat means, a guide member in said bore adjacent said inlet formed with a projection slideably engaging said recess, a rod adjustably secured to said inlet end of said tubular member and extending through said spacer and said aperture in said valve member into said recess and formed with an enlarged portion in said recess of greater width than said valve member aperture, and said body having a port between said piston and said outlet providing communication between said bore and the atmosphere.

10. Apparatus according to claim 9, wherein a cap formed with a central aperture is adjustably secured to the outlet end of said body and means extend between said cap and said regulating spring for varying the effectiveness of said spring when the position of said cap on said body is varied.

References Cited in the file of this patent

UNITED STATES PATENTS

| 1,210,891 | Blanchard et al. | Jan. 2, 1917 |

FOREIGN PATENTS

| 655,579 | Great Britain | July 25, 1951 |